United States Patent [19]

Kaneko et al.

[11] Patent Number: 4,586,812
[45] Date of Patent: May 6, 1986

[54] COPYING APPARATUS

[75] Inventors: Tamaki Kaneko, Fujisawa; Yasuhiro Takahashi, Tokyo; Tsugio Okuzawa, Tokyo; Isao Nakamura, Tokyo; Kohshi Ebata, Yokohama, all of Japan

[73] Assignee: Ricoh Company, Ltd.

[21] Appl. No.: 666,983

[22] Filed: Oct. 31, 1984

[30] Foreign Application Priority Data

| Nov. 1, 1983 | [JP] | Japan | 58-205419 |
| Nov. 2, 1983 | [JP] | Japan | 58-206786 |
| Nov. 4, 1983 | [JP] | Japan | 58-207166 |
| Nov. 9, 1983 | [JP] | Japan | 58-210595 |
| Nov. 9, 1983 | [JP] | Japan | 58-210596 |
| Nov. 11, 1983 | [JP] | Japan | 58-212233 |
| Nov. 14, 1983 | [JP] | Japan | 58-213815 |

[51] Int. Cl.$^4$ .................................................. G03G 15/00
[52] U.S. Cl. ..................................... 355/24; 355/3 R; 355/3 SH
[58] Field of Search ................. 355/3 R, 14 R, 3 SH, 355/14 SH, 24, 25, 26

[56] References Cited

U.S. PATENT DOCUMENTS

| 3,548,783 | 12/1970 | Knapp | 355/26 X |
| 3,694,073 | 9/1972 | Bhagat | 355/24 |
| 4,236,814 | 12/1980 | Tonkin | 355/26 |
| 4,330,197 | 5/1982 | Smith et al. | 355/26 X |
| 4,350,439 | 9/1982 | Tanioka et al. | 355/14 SH |

Primary Examiner—A. C. Prescott
Attorney, Agent, or Firm—Guy W. Shoup

[57] ABSTRACT

A copying apparatus capable of copying and printing an image of a document on one side or on either side of a printing sheet including a plurality of image recording units each including an image recording member and a variety of devices associated with the image recording member for performing image copying. The adjacent two image recording units are connected together by a printing sheet transporting path provided with printing sheet reversing means having a switch member. Printing sheets each having an image of a document copied and printed on one side thereof by the image recording member of the first image recording unit have their posture reversed by the printing sheet reversing means so that an opposite side thereof will face the image recording member of the second image recording unit, whereby the image of the document can be printed on the opposite side of the printing sheets.

11 Claims, 5 Drawing Figures 4,586,812

COPYING APPARATUS

BACKGROUND OF THE INVENTION

This invention relates to copying apparatus, and more particularly it is concerned with a copying apparatus of the type capable of copying and printing an image of a document on a printing sheet either on one or either side thereof.

Several types of copying apparatus have hitherto been available for copying and printing an image of a document on a printing sheet on either side thereof. Of these copying apparatus, the most common one is the type of copying apparatus shown in Japanese Patent Publication No. Sho-49-36264 in which a single photosensitive drum is used and the path of movement of printing sheets forms a loop including trays for supporting printing sheets to be printed on either side thereof. This type of copying apparatus has suffered the disadvantages that it has a high incidence of jamming of the printing sheets and a great deal of trouble occurs and that producing a copy printed with an image of a document on either side thereof is a time-consuming operation.

To obviate these disadvantages, improved copying apparatus capable of printing an image of a document on either side thereof have been developed, as described in U.S. Pat. No. 3,536,398 and Japanese Patent Application Laid-Open No. Sho-56-161559, which use two photosensitive drums for printing an image of a document on either side of a printing sheet. Some disadvantages are associated with this type of copying apparatus, too. For example, in this type of copying apparatus, it is necessary to bring images of a document printed on opposite sides of a printing sheet into alignment with each other and an optical system becomes complex in construction to attain the end.

Even if the copying apparatus used is for copying and printing an image of a document on either side of a printing sheet, the need often arises to produce a copy having an image of a document printed only on one side thereof. Copying apparatus of the prior art capable of copying and printing an image of a document on either side of a printing sheet are capable, of course, of printing an image of a document only on one side of a printing sheet. However, since a printing sheet is conveyed along the same path of travel when only one side thereof is to support an image of a document and when either side thereof is to support it, they suffer the disadvantage that producing copy having an image of a document only on one side thereof is a time-consuming operation. Moreover, even if these copying apparatus each have two photosensitive drums, they only have the function of copying apparatus having one photosensitive drum, so that their performance is not satisfactory.

SUMMARY OF THE INVENTION

This invention has been developed for the purpose of obviating the aforesaid disadvantages of the prior art. One of the objects of the invention is to provide a copying apparatus capable of copying and printing an image of a document not only on one side of a printing sheet but also on either side thereof, wherein the path of travel of printing sheets is simplified in layout, so that the incidence of jamming of printing sheets is decreased and the time required for producing a copy of a document is shortened.

Another object is to provide a copying apparatus capable of copying and printing an image of a document on either side of a printing sheet automatically and at high speed in a both-sides repeat copying and printing mode.

Still another object is to provide a copying apparatus capable of selectively copying and printing an image of a document on one side of a printing sheet or on either side thereof.

To accomplish the aforesaid objects, there is provided a copying apparatus capable of copying and printing an image of a document on either side of a printing sheet comprising a plurality of image recording members, a plurality of optical systems each mounted for forming an image of a document on one of the plurality of image recording members, a path of travel of printing sheets connecting the plurality of image recording members together, and means for reversing the position or posture of a printing sheet located at the path of travel of the printing sheets, wherein an image of a document supported on either of the plurality of image recording members is printed on either side of the same printing sheet by transfer printing.

As described hereinabove, in the copying apparatus according to the invention, the plurality of image recording members are connected together by the path of travel of the printing sheets having the printing sheet reversing means. This structural arrangement enables the path of travel of the printing sheets to be simplified and shortened while rendering same substantially straight, making it possible to reduce the incidence of jamming of the printing sheets and obtain at high speed a copy of a document having an image of the document printed on either side thereof while using optical systems of simple construction.

According to the invention, a printing sheet reversing intermediate sheet tray for temporarily storing a printing sheets and ejecting same therefrom to feed same to a second printing station after reversing their posture is mounted on the path of travel of the printing sheets in addition to the printing sheet reversing and conveying means, with the printing sheet reversing intermediate sheet tray and the printing sheet reversing and conveying means being selectively actuated.

In the copying apparatus of the above-mentioned construction, the printing sheet reversing and conveying means and the printing sheet reversing intermediate sheet tray are selectively used so that an image of a document can be printed on either side of the same printing sheet selectively in a both-sides separate copying and printing mode or a both-sides repeat copying and printing mode. This makes it possible to handle the printing sheets adequately either separately at high speed or as a batch in accordance with the selected copying and printing mode for forming an image of a document on either side of the same printing sheet. This arrangement is also useful for printing an image of a document only on one side of a printing sheet.

According to the invention, a second intermediate sheet tray may be provided and connected in parallel with the path of travel of the printing sheets, so that it can be selectively used for receiving a printing sheet that has had its posture reversed by the printing sheet reversing and conveying means and feeding same to the second printing station.

The provision of the second intermediate sheet tray to the path of travel of the printing sheets for selective use offers the advantage that when jamming of the printing sheets occurs in the second image recording member, image printing on one side of each of a plurality of printing sheets can be continued by means of the first image recording member by selectively using the printing sheet reversing intermediate tray, and that when image printing is performed after the jamming has been eliminated on an opposite side of each of the printing sheets by feeding the printing sheets from the printing sheet reversing intermediate tray, the image printing on the one side can be continued by utilizing the second intermediate tray. This arrangement is conductive to an increase in efficiency with which sheet jamming is eliminated enabling necessary steps to be taken to resume a normal printing operation.

According to the invention, a partition member may be mounted in the printing sheet reversing intermediate tray. This makes it possible to actuate both the first and second recording members to perform image printing by the two members simultaneously even when image printing on both sides of the printing sheets is performed in the both-sides repeat copying and printing mode. This is conducive to an increase in the operation efficiency of the copying apparatus, and printing sheets can be automatically handled by utilizing automatic document conveying means.

In the copying apparatus according to the invention, when image printing is performed only on one side of each printing sheet, second image forming means may be used. By this arrangement, when it becomes necessary to perform image printing on both sides of each printing sheet, image printing can be performed by the second image forming means on one side of each printing sheet which also requires image printing to be performed on an opposite side thereof simultaneously as the image printing is performed only on one side of each printing sheet. Thus, it is possible to perform image printing simultaneously only on one side of each printing sheet and on both sides of each printing sheet by utilizing first image forming means. This is conducive to an increase in the operation efficiency of the copying apparatus and gives versatility to the copying apparatus.

According to the invention, an image recording member, an optical system, a printing sheet feeding section and automatic document conveying means may be formed into a single image forming unit, and two image forming units may be connected together by a reversing and conveying unit including a path of travel of printing sheets provided with printing sheet reversing means and a path of travel of a document provided with document reversing means while the printing sheet feeding sections and the automatic document conveying means of the two image forming units may be connected to each other.

By this arrangement, the copying apparatus can perform image printing readily either on one side of each printing sheet or on either side of each printing sheet, thereby giving versatility to the printing machine.

DESCRIPTION OF THE PREFERRED EMBODIMENTS

Preferred embodiments of the invention will now be described by referring to the accompanying drawings.

Figure 1:
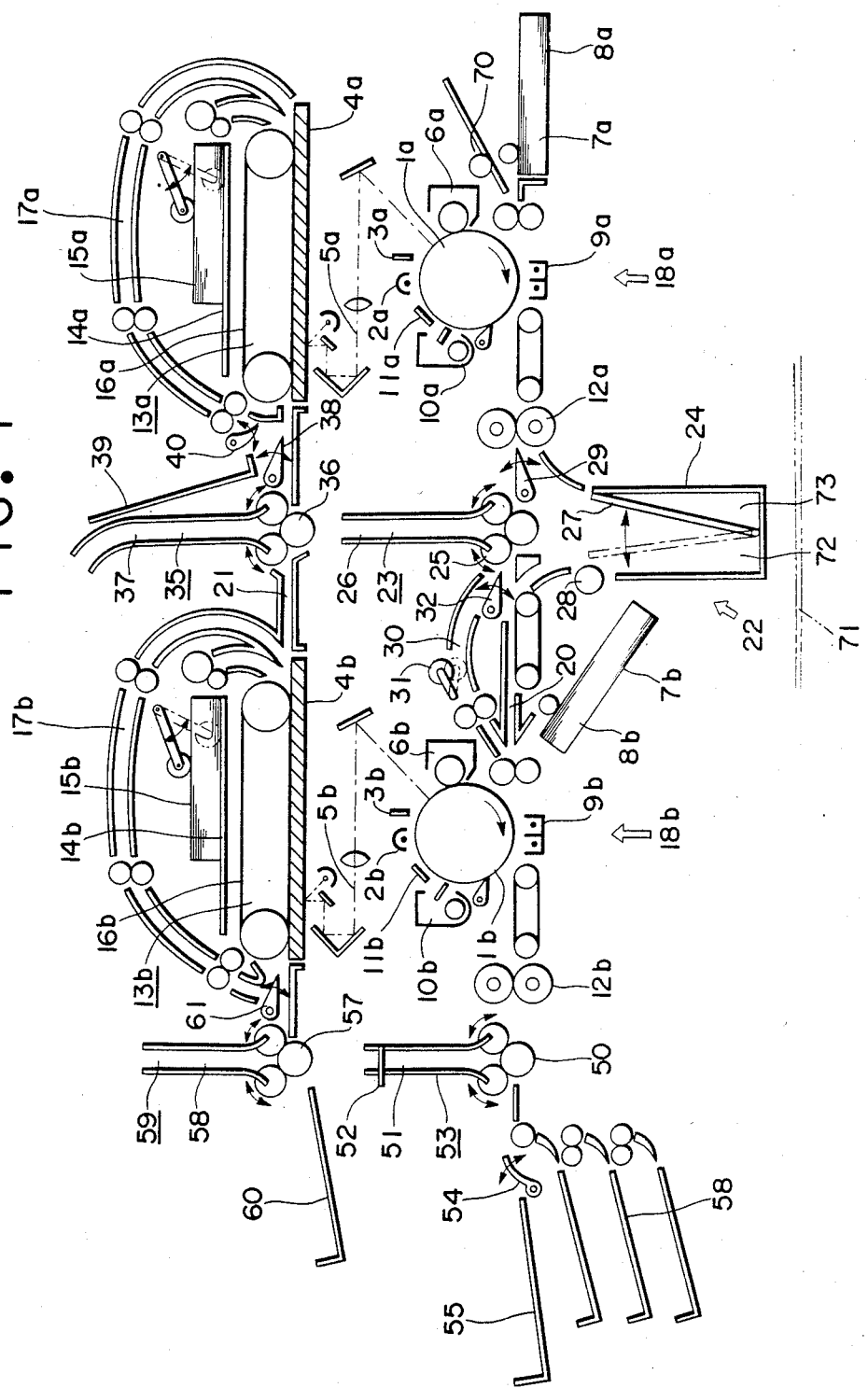
FIG. 1 is a schematic side view of the copying apparatus comprising one embodiment of the invention.

Referring to FIG. 1, the copying apparatus comprises two photosensitive drums 1a and 1b constituting a first image recording member and a second image recording member respectively. The copying apparatus also comprises chargers 2a and 2b, erasers 3a and 3b, optical systems 5a and 5b for exposing and forming optical images of documents placed on contact glass members 4a and 4b, developing devices 6a and 6b, printing sheet feeding sections 8a and 8b for feeding printing sheets 7a and 7b, separating and printing chargers 9a and 9b, cleaning devices 10a and 10b, charge removing devices 11a and 11b and fixing devices 12a and 12b associated with the photosensitive drums 1a and 1b, respectively, for performing a predetermined electrophotographic copying and printing process. The contact glass member 4a and 4b are provided with automatic document conveying means 13a and 13b which comprise conveyor belts 16a and 16b for conveying documents 15a and 15b placed on documents supports 14a and 14b, and recycling paths 17a and 17b, respectively. Thus, these parts, systems and devices constitute first image forming means 18a and second image forming means 18b, respectively.

Figure 2:
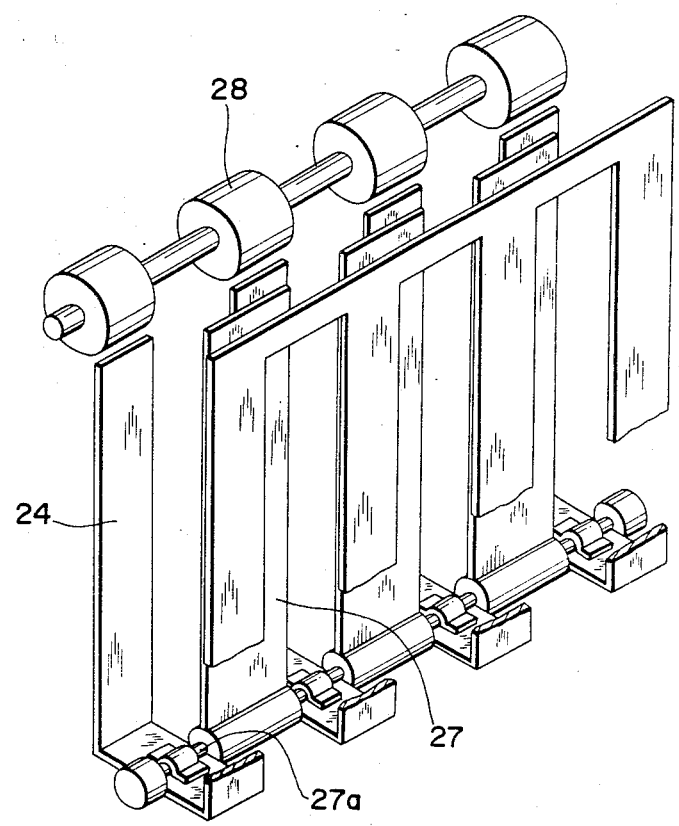
FIG. 2 is a perspective view of the intermediate sheet tray.

The first and second image forming means 18a and 18b of the above-mentioned construction are connected together by a printing sheet transporting path 20 and a document transporting path 21. The printing sheet transportion path 20 which connects the first and second photosensitive drums 1a and 1b together for transporting printing sheets 7a from the first image forming means 18 to the second image forming means 18b is substantially straight and provided with printing sheet reversing means 22 located therein. The printing sheet reversing means 22 comprises a printing sheet reversing and conveying means 23 for reversing the position or posture of a printing sheet 7a and immediately conveying same to the second image forming means 18b, and a printing sheet reversing intermediate tray 24 located beneath the printing sheet reversing and conveying means 23 for temporarily storing a plurality of printing sheets 7a which are later conveyed to the second image forming means 18b after having their position or posture reversed. As is well known, the printing sheet reversing and conveying means 23 includes a set of three rollers 25, and a reversing path 26, in which when the two upper rollers 25 which are follower rollers are positioned to open the reversing path 26, the printing sheet 7a enters the reversing path 26 and has its posture reversed before being conveyed to the second image forming means 18b, but when the two follower rollers 25 are positioned to close the reversing path 26, the printing sheet 7a merely passes through the rollers 25 without having its posture reversed. The printing sheet reversing intermediate tray 24 essentially comprises a partition plate 27 functioning as a partition member, and a sheet feeding roller 28. As shown in detail in FIG. 2, the tray 27 includes front and rear walls which are each in the form of a comb, and the partition plate 27 is also in the form of a comb and pivotably movable about a shaft 27a. The partition plate 27 is formed of flexible material and the path of its pivotal movement is reduced in size by a bottom plate 71. The printing sheet reversing intermediate tray 24 is divided by the partition plate 27 into a sheet feeding section 72 located near the second image forming means 18b (leftwardly in FIG. 2) for feeding by means of the feeding roller 28 to the second image forming means 18b those printing sheets 7a which are temporarily stored in the tray 24, and a storing section 73 located near the first image forming means 18a (rightwardly in FIG. 2) for temporarily storing those printing sheets 7a which have an image of the document printed on one side thereof. A switch member 29 is provided to switch the printing sheets 7a between the printing sheet reversing and conveying means 23 and printing sheet reversing intermediate tray 24. A second intermediate printing sheet tray 30 is located opposite the fixing device 12a and 12b with respect to the printing sheet reversing means 22 for storing therein those printing sheets 7a which have had their posture reversed. Along with a sheet feeding roller 31, the second intermediate printing sheet tray 30 is located parallel to the printing sheet transporting path 20, and a switch member 32 is provided to switch the printing sheets 7a between the printing sheet transporting path 20 and second intermediate printing sheet tray 30.

Meanwhile, the document transporting path 21 which connects together the automatic document transporting means 13a and 13b for transporting the document 15a from the first image forming means 18a to the second image forming means 18b is substantially straight and has document reversing means 35 located therein. The document reversing means 35 includes, like the printing sheet reversing and conveying means 23, a set of three rollers 36 and a reversing path 37 in which a document may be manually inserted from outside. A switch member 38 is disposed posterior to the automatic document conveying means 13a for selectively forwarding a document either to the document transporting path 21 or to the recycling path 17. Also provided is a switch member 40 for selectively forwarding a document either to a document ejecting tray 39 located posterior to the automatic document conveying means 13a or to the recycling path 17a.

Reversing and discharging means 53 disposed posterior to the fixing device 12b on the photosensitive drum 1b side includes a set of three rollers 51, a reversing path 51 and a sheet folding stopper 52. Disposed posterior to the reversing and discharging means 43 are an ejecting tray 55 and a sorter 56 selectively actuated by a switch member 54. Disposed posterior to the automatic document conveying means 13b is reversing and discharging means 59 including a set of three rollers 57, and a reversing path 58. An ejecting tray 60 is disposed posterior to the reversing and discharging means 59. The numeral 61 designates a switch member for selectively forwarding a document either to the reversing and discharging means 59 or to the recycling path 17b.

The numeral 70 designates a manual sheet feeding section located parallel to the sheet feeding section 8a.

In the embodiment of the above-mentioned construction, the copying apparatus can be at various different operation modes. Although no switches and control circuits are shown and described, it will be understood that the copying apparatus according to the invention can be set at any operation mode as desired by means known to one of ordinary skill in the art.

Figure 3:
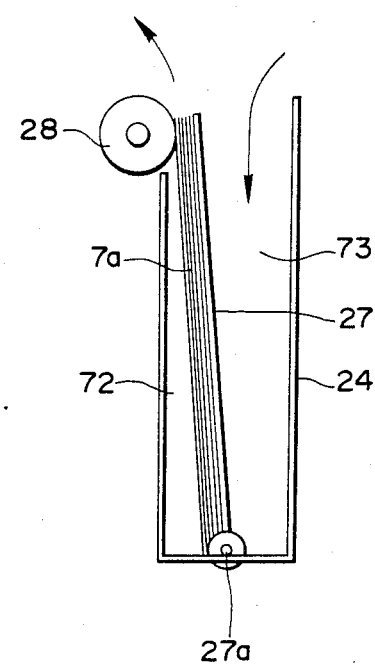
FIGS. 3 and 4 are views in explanation of the operation of the intermediate sheet feed tray shown in FIG. 2.
Figure 4:
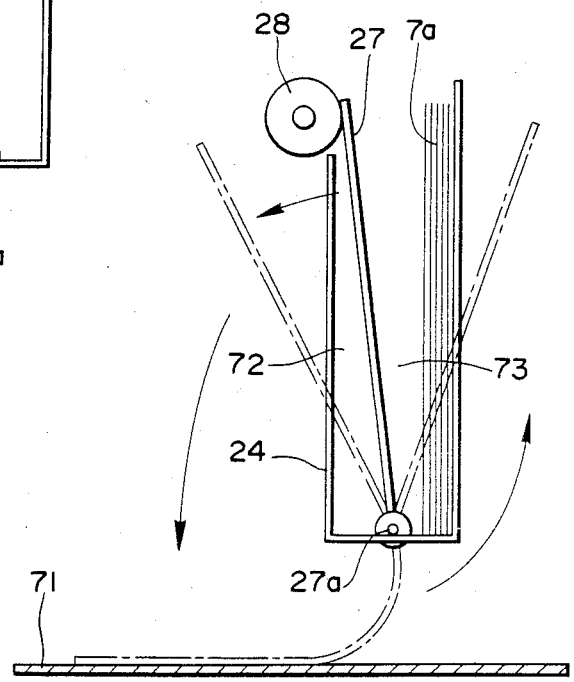

First, assume that the operator has set the copying apparatus at a both-sides repeat copying and printing mode in which a plurality of printing sheets each have printed on both sides thereof, to provide a plurality of printed sheets or copies of the documents 15a. The document 15a is set on the document support 14a. Upon a printing commencing button being depressed, the document 15a is transported by the conveyor belt 16a to the contact glass member 4a where it stops. Then, the optical system 5a is actuated to expose the photosensitive drum 1a, which is rotating, to an optical image of the image on one side of the document 15a, to form an electrostatic latent image of the document 15a thereon. The electrostatic latent image thus formed is developed by the developing device 6a into a toner image which is printed by the action of the separating and printing charger 9a on the printing sheet 7a fed from the sheet feeding section 8a in timed relation. The printing sheet 7a having the toner image formed thereon is passed through the fixing device 12a, thereby completing the operation of copying and printing the image which is supported on one side of the document 15a on one side of the printing sheet 7a. The above-mentioned operation is repeatedly performed with respect to the document 15a placed on the document support 14a as number of times equal to the number of copies to be produced. The printing sheets 7a each having printed on one side thereof the image which is supported on one side of the document 15a are successively ejected from the fixing device 12a on to the printing sheet reversing intermediate tray 24 to be temporarily stored therein. At this time, the partition plate 27 in the printing sheet reversing intermediate tray 24 is in an initial condition indicated by solid lines in FIG. 1, so that the tray 24 is not partitioned into the sheet feeding section 72 and storing section 73 yet. After the image which is supported on one side of the document 15a has been printed on one side of each of the predetermined number of printing sheets 7a, the document 15a on the contact glass member 4a is conveyed to the contact glass member 4b while having its posture reversed on the way by document reversing means 35, before being set on the contact glass member 4b. Located in the printing sheet reversing intermediate tray 24 or immediately anterior thereto on the sheet transporting path 20 is printed sheet number sensing means, not shown, which senses the printing sheets 7a which have been printed by the first side printing. When the printing sheets 7a sensed by the printed sheet number sensing means reaches the predetermined number, the partition plate 27 is switched to the sheet feeding roller 28 side as indicated by phantom lines in FIG. 1 or 3 to force the printing sheets 7a against the sheet feeding roller 28 to be ready to start feeding the printing sheets 7a to the second photosensitive drum 1b. Thus, the printing sheets 7a are located in the sheet feeding section 72 of the tray 24, and the storing section 73 is located right-wardly of the partition plate 27. Thus, the document 15a placed on the contact glass member 4b is ready for an operation for copying and printing the image which is supported on an opposite side thereof on the predetermined number of printing sheets 7a which now press against the sheet feeding roller 28. Thus, the printing sheets 7a each having printed on one side thereof the image which is supported on one side of the document 15a are successively fed from the intermediate tray 24 by the sheet feeding roller 28 in a condition in which an opposite side faces upwardly, so that the image of the document 15a supported on the opposite side thereof is printed on the opposite side of each of the predetermined number of printing sheets 7a having printed on one side thereof the image which is supported on one side of the document 15a. At this time, the next following document 15a is already set on the contact glass member 4a of the first image forming means 18a, and another both-sides repeat copying and printing operation is started to print on one side of each of a predetermined number of printing sheets 7a the image which is supported on one side of the next following document 15a by the first photosensitive member 1a. Those printing sheets 7a which each have had printed on one side thereof the image supported on one side of the next following document 15a are successively delivered to the storing section 73 of the printing sheet reversing intermediate tray 24. Stated differently, while the operation of printing on the opposite side of one set of printing sheets 7a the image of the document supported on the opposite side thereof is being performed by the second image forming means 18b, the operation of printing on one side of another set of printing sheets 7a the image of the next following document 15a supported on the opposite side thereof is performed by the first image forming means 18a. Thus, while the sheet feeding section 72 of the printing sheet reversing intermediate tray 24 handles those printing sheets 7a which already have their one side printed with the image of the document 15 supported on one side thereof, the storing section 73 thereof handles those printing sheets which already have their one side printed with the image of the next following document 15a supported on one side thereof. When the both-sides repeat copying and printing operation performed on one document 15a is finished, the storing section 73 is filled with the predetermined number of printing sheets 7a to be handled in the both-sides repeat copying and printing operation and the sheet feeding section 72 becomes empty. Thus, the partition plate 27 continuously shifts in the tray 24 while moving in pivotal movement as indicated by phantom lines in FIG. 4, to move the printing sheets 7a from the storing section 73 to the sheet feeding section 72, so that the tray 24 returns to the condition shown in FIG. 3 in which the storing section 73 is empty.

Now, assume that the operator has set the apparatus at a both-sides separate copying and printing mode to produce a single copy from one document in which one side of the copy has the image which is supported on one side of the document printed thereon while an opposite side of the copy has the image which is supported on an opposite side of the document printed thereon. The operation performed in this mode is essentially similar to that performed in the both-sides repeat copying and printing mode. However, in this mode, the switch member 29 is actuated to select the printing sheet reversing and conveying means 23 in place of the printing sheet reversing intermediate tray 24. To start the operation, a document 15a is set on the document support 14a, and then conveyed by the conveyor belt 16a to the contact glass member 4a as the start button is depressed. The document 15a becomes stationary on the contact glass member 4a and has one side thereof scanned by the optical system 5a to expose the rotating photosensitive drum 1a to an optical image supported on one side of the document 15a, to form an electrostatic latent image on the photosensitive drum 1a. The electrostatic latent image formed is developed by the developing device 6a and printed as a toner image by the action of the separating and printing charger 9a on a printing sheet 7a fed from the sheet feeding section 8a in timed relation. Then, the printing sheet 7a is passed through the fixing device 12a to provide a copy sheet having the image supported on one side of the document printed on one surface of the copy sheet. Thereafter, the document 15a on the contact glass member 4a is conveyed by the conveyor belt 16a to the document reversing means 35 which reverses the posture of the document 15a so that the document 15a moves to the automatic document transporting means 13b with an opposite side thereof facing downwardly. At the automatic document transporting means 13b, the document 15a is conveyed by the conveyor belt 16b to the contact glass member 4b and set thereon. Meanwhile, the copy sheet 7a having printed on one side thereof the image supported on one side of the document 15a is passed on to the printing sheet reversing and conveying means 23 where its posture is reversed so that an opposite side thereof which is yet to be printed faces upwardly, and the copy sheet 7a moves along the printing sheet transporting path 20 to be ready for a printing operation to be performed by means of the photosensitive drum 1b, to print on the opposite side of the copy sheet 7a the image supported on the opposite side of the document 15a. (At this time, a printing operation is being performed by the photosensitive drum 1a to form on one surface of another printing sheet 7a a latent image of the next following document 15a.) On the photosensitive drum 1b side, the document 15a set on the contact glass member 4b has its opposite side scanned by the optical system 5b to expose the photosensitive drum 1b to an optical image of the opposite side of the document 15a to form an electrostatic latent image which is processed through developing, printing and fixing to provide a printed sheet 7a which has its both sides printed with document images. Then, the document 15a and the printed sheet 7a are discharged into the ejecting trays 60 and 55, respectively. When necessary, the document 15a and printed sheet 7a may be reversed or a sorter 56 may be used.

Assume that the operator has set the apparatus at a both-sides copying and printing mode in which a printing sheet or sheets each have document images printed on both sides thereof from a document or documents each having an image only one side. In this mode, either a separate copying and printing mode or a repeat copying and printing mode may be chosen selectively. In the former, the printing sheet reversing and conveying means 23 is rendered operative; in the latter, the printing sheet reversing intermediate tray 24 is rendered operative. When the documents 15a are large in number, there are two systems for handling them. In one system, all the documents are placed on the document support 14a of the automatic document conveying means 13a. After the operation of printing the image supported on one side of each document 15a of odd-number (one side) by the photosensitive drum 1a is finished, the document 15a of odd-number on the contact glass member 4a is discharged at once through the document transporting path 21 and contact glass member 4b. Meanwhile, the document 15a of even-number (opposite side) on the document support 14a is moved through the contact glass member 4a and document transporting path 21 and placed on the contact glass member 4b, so that the image supported on the opposite side of the document can be printed. In this system, the document reversing means 35 is rendered inoperative. In the other system, the documents are divided into those which have the image supported on one side copied and those which have the image supported on the other side copied, and the former are placed on the document support 14a as documents 15a while the latter are placed on the document support 14b as documents 15b. In this system, the automatic document conveying means 13a and 13b are separately rendered operative. The document transporting path 21 is closed by the action of the switch member 38, and the documents 15a whose image on one side thereof is copied are discharged into an ejecting tray 39 after being guided by a switch member 40.

Whichever system may be used, in this copying and printing mode, copies having one side thereof printed with an image of the document are produced by the first image forming means 18a, and copies having an opposite side thereof printed with an image of the document are produced by the second image forming means 18b, to produce copies having both sides printed with the images of the document by the cooperation of the first and second image forming means 18a and 18b. In this case, the printing sheets 7a are passed from the photosensitive drum 1a side to the photosensitive drum 1b side through the printing sheet transporting path 20 which is small in length and substantially straight. This is conducive to a decrease in the incidence of jamming of the printing sheets 7a and an improvement in printing speed. This also applies to the documents. The document transporting path 21 connecting the automatic document conveying means 13a and 13b together is short and substantially straight, so that the incidence of jamming of the documents can be greatly decreased. Since the printing sheets 7a are transported to the photosensitive drum 1b side after having printed on one side thereof the image on one side of the documents 15a and after having their posture reversed by the printing sheet reversing means 23, feeding the sheets 7a can be performed in the same manner as feeding the sheets 7a to the photosensitive drum 1a is effected. This makes it possible to render the arrangement of the optical system and other devices necessary for performing copying by the first image forming means 18 similar to the equivalent arrangement for the second image forming means 18b. This eliminates the need to provide the optical systems with a complex construction to bring the images into alignment with each other on the printing sheets. As a result, the documents can be moved simply from the first image forming means 18a to the second image forming means 18b. By utilizing the automatic document conveying means 13a and 13b, it is possible to produce automatically in a short period of time a large number of copies of documents having images printed on both sides thereof.

Assume that when copies of documents having images printed on both sides thereof are being produced, jamming has occured in the second image forming means 18b. At this time, a jam sensor, not shown, of the second image forming means 18b interrupts the operation of printing on an opposite side of each printing sheet the image of each document which is supported on an opposite side thereof by the second image forming means 18b, so as to eliminate the trouble. However, the copying operation being performed by the first image forming means 18a is not interrupted and printing on one side of each printing sheet the image of each document supported on one side thereof is continued. Thus, even if the printing sheet reversing and conveying means 23 has been selected as printing sheet reversing means 22 to perform the copying operation on both sides of the printing sheets, the switch member 29 is actuated upon sensing jamming by the jam sensor to select the printing sheet reversing intermediate tray 24. As a result, the printing sheets 7a being processed by the first image forming means 18a to print on one side thereof the image which is supported on one side of each document are temporarily stored in the printing sheet reversing intermediate tray 24, to standby. At this time, in the printing sheet reversing intermediate tray 24, the partition plate 27 is pivotally moved leftwardly in FIGS. 3 and 4 each time the printing sheet 7a is introduced into the tray 24, so that the printing sheets 7a are arranged in an orderly manner therein. After the jamming of the sheets in the second image forming means 18b is eliminated, the printing sheets 7a are fed again from the printing sheet reversing intermediate tray 24 to the photosensitive drum 1b to start the operation of printing on the opposite side of each printing sheet the image supported on the opposite side of each document performed by the second image forming means 18b, thereby producing copies each having printed on both sides thereof the images which are supported on both sides of each document. In the embodiment of the invention shown and described hereinabove, when copies of documents are produced in which each copy has printed on both sides thereof the images of the document supported on both sides thereof, the copying operation can be continued by the first image forming means 18a even if jamming of sheets and/or documents occurs on the second image forming means 18b side, to enable the image supported on one side of each document to be printed on one side of each printing sheet while steps are being taken to eliminate the jamming. After the jamming has been eliminated, the operator has only to feed the printing sheets 7a from the printing sheet reversing intermediate tray 24 to the second photosensitive drum 1b in the same manner as a copying operation is usually performed in a copying apparatus of the prior art for producing copies having the image of the original printed only on one side of each copy. Thus, even if a sheet or document jam occurs, the copying operation can be continued without suffering a decrease in efficiency.

In the embodiment of the invention constructed as described hereinabove, it would be impossible to feed the printing sheets 7a to the photosensitive drum 1b side or store same in the printing sheet reversing intermediate tray 24 (they will find their way to the back of the partition plate 27) by continuing the operation of printing the image of the document on one side of each printing sheet, when all the documents have not finished with printing of the image which is supported on one side thereof on one side of printing sheets following elimination of jamming. However, this problem is solved by the invention by means of the second intermediate printing sheet tray 30. More specifically, while the operation of printing the image of the document which is supported on the opposite side thereof on the opposite side of each printing sheet is being performed by feeding the printing sheets from the printing sheet reversing intermediate tray 24 to the photosensitive drum 1b after elimination of jamming, the operation of printing the image of the document which is supported on one side thereof on one side of each of the printing sheets is continued by the first image forming means 18a, and the printing sheets 7a printed with the image of the document are temporarily stored in the second intermediate printing sheet tray 30 by means of the switch member 32, after having their posture reversed by the printing sheet reversing and conveying means 23. This operation is temporarily performed until the operation of feeding the printing sheets 7a from the printing sheet reversing intermediate tray 24 to the photosensitive member 1b is terminated. Following termination of the operation of feeding the printing sheets 7a from the printing sheet reversing intermediate tray 24 to the photosensitive drum 1b, the sheet feeding roller 31 is actuated to print the image of the document which is supported on the opposite side thereof on the opposite side of each of the printing sheets 7a temporarily stored in the second printing sheet intermediate tray 30 which already has printed on the side thereof the image of the document which is supported on one side thereof. If the first image forming means 18a is operative to print on one side of each of the printing sheets 7a the image of the document which is supported on one side thereof while the operation of printing the image of the document which is supported on the opposite side thereof on the opposite side of each of the printing sheets 7a is being performed as noted hereinabove, then such printing sheets 7a are stored in the printing sheet reversing intermediate tray 24.

Thus, the presence of the second intermediate printing sheet tray 30 enables the operation of copying the image of a document supported on one side thereof to be continued by the first image forming means 18a while the operation of copying an image supported on the opposite side of the document is being performed by the second image forming means 18b following elimination of jamming of sheets and/or documents. This is conducive to improved efficiency in eliminating jamming.

By using the second intermediate printing sheet tray 30 (including the printing sheet reversing and conveying means 23) and the printing sheet reversing intermediate tray 24 alternately by selection, it is possible to perform the operation of copying the image of a document which is supported on one side thereof and the operation of copying the image of the document which is supported on the opposite side thereof to be performed simultaneously, in the both-sides repeat copying and printing mode.

When the two operations are performed simultaneously as noted hereinabove, the documents may be handled as follows. The documents may be all set on the automatic document conveying means 13a when it is desired to have the images on both sides thereof copied. In this case, the documents processed before jamming has occured may be all discharged into the ejecting tray 39 after jamming has occured, and only those documents which are required for copying the image supported on the opposite side thereof may be manually fed from the reversing section 37 when the second image forming means 18b is rendered operative. Alternatively, the necessary documents may be set on the document support 14b before rendering the automatic document conveying means 14b operative. When the documents having an image supported only one side are divided into the documents 15a and documents 15b and placed on the document supports 14a and 14b respectively, the automatic document conveying means 13a may be allowed to continued operation although the automatic document conveying means 13b is rendered inoperative, after jamming is sensed.

In the embodiment of the invention described hereinabove, the printing sheet reversing means 22 comprises the printing sheet reversing and conveying means 23 and the printing sheet reversing intermediate tray 24 which are disposed above and below the printing sheet transporting path 20 and can be selectively actuated by means of the switch member 29. Thus, when the apparatus is set at a both-sides separate copying and printing mode, the printing sheet reversing and conveying means 23 is selected, so that the printing sheets 7a having one side thereof printed with the image of the document are immediately fed to the photosensitive drum 1b after having their posture reversed. This is conductive to a shortening of the time required for performing the both-sides copying and printing operation. Particularly when the apparatus is set at a both-sides separate copying and printing mode in which the documents having images on both sides thereof are printed on printing sheets on both sides thereof, the document 15a is conveyed substantially in the same manner as the printing sheet 7a is conveyed, so that no difficulties are experienced in coordinating the operations performed by the first and second image forming means 18a and 18b. Meanwhile, when the apparatus is set at a both-sides repeat copying and printing mode, the printing sheet reversing intermediate tray 24 is selected, and the printing sheets 7a are temporarily stored in the storing section 73 after one side thereof is printed with the image of the document. This makes it easy to coordinate the movements of the printing sheets 7a with the movements of the documents 15a on the automatic document conveying means 13a. That is, in a both-sides repeat copying and printing mode, even if the printing sheets 7a having the image of the document printed on one side thereof are immediately passed on to the photosensitive drum 1b, repeat printing is not possible because the document whose image is to be printed on the opposite side of the printing sheets is still being handled by the automatic document conveying means 13a. Thus, it is advantageous for the printing sheets 7a having the image of the document printed on one side thereof to standby in the printing sheet reversing intermediate tray 24. By checking the actual number of printing sheets 7a discharged from the first image forming means 18a and stored in the printing sheet reversing intermediate tray 24, counting the printing sheets printed by repeat printing can be positively performed and the number of printing sheets involved in jamming can be readily determined. When the image of the document is printed on the opposite side of the printing sheets, the printing sheets 7a are fed continuously one by one from the printing sheet reversing intermediate tray 24 to the photosensitive drum 1b, in the same manner as printing sheets would be fed to the photosensitive member 1b if the second image froming means 18b constituted an independent copying apparatus. Thus, no delay in producing copies occurs. It will be seen that when the apparatus is set at a both-side separate copying and printing mode, the printing sheets 7a can be handled separately by means of the printing sheet reversing and conveying means 23, and that when the apparatus is set at a both-sides repeat copying and printing mode, the printing sheets 7a can be handled as a batch by means of the printing sheet reversing intermediate tray 24. Thus, the invention enables the printing sheets to be suitably handled depending on the selected mode. In the both-sides repeat copying and printing mode, the printing sheet reversing intermediate tray 24 is selected. The tray 24 comprises the sheet feeding section 72 and storing section 73, so that it is possible to feed to the photosensitive drum 1b from the sheet feeding section 72 those printing sheets 7a which are going to be printed with the image of the document supported on the opposite side thereof while receiving and storing in the storing section 73 those printing sheets 7a which have the image of the next following document 15a printed on one side thereof. Thus, it is possible to perform a copying operation by the second image forming means 18b while another copying operation is being performed by the first image forming means 18a in the both-sides repeat copying and printing mode as in the both-sides separate copying and printing mode. This is conducive to improved copy producing efficiency.

As noted hereinabove, in the both-sides separate copying and printing mode, the printing sheet reversing and conveying means 23 is selected for operation. However, jamming of printing sheets may occur in the printing sheet reversing and conveying means 23. Generally, when a jam occurs in a copying appratus, it is impossible to continue operation until the jam is eliminated. However, in the embodiment of the invention, when jamming of printing sheets taking place in the sheet reversing and conveying means 23, it is possible to continue the operation in the both-sides separate copying and printing mode without shutting down the machine by actuating the switch member 20 upon receipt of a jam signal, to actuate the printing sheet reversing intermediate tray 24 while rendering inoperative the printing sheet reversing and conveying means 23. At this time, steps are taken to discharge into the ejecting tray 60 a document having images on both sides thereof of which one image has been printed on one side of the printing sheet which is jammed or a corresponding document whose image will be copied on the opposite side. In continuing the copying operation, copying is started in the second image forming means 18b with the next following printing sheet to be printed on the opposite side thereof while leaving the jamming in the printing sheet reversing and conveying means 23 as it is, so that the printing sheets 7a are transferred to the printing sheet reversing intermediate tray 24 from which they are immediately fed to the photosensitive drum 1b to have an image printed on the other side thereof. Following completion of the operation of printing the image on the both sides of the other documents on the printing sheets 7a, images are printed on both sides of the printing sheets from both sides of a document corresponding to the printing sheets involved in the jamming. After all the operations have been completed, the machine is shut down to take necessary steps to remove the printing sheets involved in the jamming in the printing sheet reversing and conveying means 23. In the embodiment shown and described herein, it is possible to continue copying to obtain copies having images printed on both sides thereof without shutting down the machine even if jamming of printing sheets occurs in the printing sheet reversing and conveying means 23, as noted hereinabove. This makes it possible to meet the requirement of quickly providing copies, thereby improving copying efficiency. Particularly, when on taken into consideration the fact that since the printing sheet reversing and conveying means 23 is located inside the machine and not a final sheet discharge section, it is difficult for the operator to cope effectively with jamming of sheets occurring therein and appeal should be made to a serviceman to eliminate the trouble, it would be considered a great contribution to the art of copying that copying could be continued without eliminating a jam even if one take place during a copying operation.

As noted hereinabove, the printing sheet reversing and conveying means 23 is rendered operative when copying is performed in the both-sides separate printing mode in the embodiment shown and described herein. However, the printing sheet reversing and conveying means 23 may be done without, and the printing sheet reversing intermediate tray 24 may be used at all times even in the both-sides separate printing mode.

The copying apparatus according to the invention is not limited to the operation of copying a document on a printing sheet on both sides thereof, but may be used for copying in a single-side copying and printing mode. Copying an image only on one side of a printing sheet can be performed in different manners. As noted hereinabove, the copying appratus according to the invention is capable of copying a document to produce copies thereof having images of the document printed on both sides by actuating the first and second image forming means 18a and 18b in a coordinated fashion. However, by actuating a switch, not shown, it is possible to separately drive the first and second image forming means 18a and 18b to enable same to perform a single-side copying and printing operation in a selected printing mode. Thus, the copying apparatus would be considered to consist of two independent copying units, so that two single-side copying and printing operations can be simultaneously performed by setting the documents 15a and 15b on the automatic document conveying means 13a and 13b and feeding the printing sheets 7a and 7b from the sheet feeding sections 8a and 8b, respectively, while actuating the photosensitive drums 1a and 1b and optical systems 5a and 5b, separately. When copies of documents having a printed image only on one side are desired to be produced in a large number, the time required to obtain the desired number of copies would be one-half the time that would be required if only one copying apparatus of the prior art were used. Thus, high-speed copying can be realized. In this case, the document 15a is discharged into the ejecting tray 39 and the printing sheets 7a are discharged into the printing sheet reversing intermediate tray 24. Thus, the paths of travel of the printing sheets 7a and 7b are smaller in length than the corresponding paths used in the both sides copying and printing mode, thereby shortening the time required for performing a copying operation. In this case, when jamming of sheets occurs in either the first image forming means 18a side or the second image forming means 18b side, the operator only has to shut down one unit in which the trouble has occurred while allowing the other unit to continue operation, because the two image forming means 18a and 18b are not coordinated operation and the printing sheets do not travel from one unit to another.

In a copying mode in which the image forming means 18a and 18b operate separately and independently, the two means 18a and 18b may be simultaneously rendered operative. However, when it is desired to perform an ordinary single-side copying and printing operation by using the copying apparatus according to the invention, the second image forming means 18 is usually rendered operative and the first image forming means 18a is allowed to remain inoperative. Thus, when the need arises to perform a single-side copying and printing operation while the second image forming means 18b is in operation, the first image forming means 18a may, of course, be actuated to produce copies of a desired number. Besides, if it becomes necessary to perform a both-sides copying and printing operation while a single-side copying and printing operation is being performed, then the both-sides copying and printing operation can be started by actuating the first image forming means 18a while the single-side copying and printing operation is being performed by the second image forming means 18b. Only the image which is supported on one side of the document is printed on one side of the printing sheets by the first image forming means 18a, and the printing sheets having printed on one side thereof the image which is supported on one side of the document are temporally stored in the printing sheet reversing intermediate tray 24. After the ordinary single-side copying and printing operation performed by the second image forming means 18b is finished, the printing sheets stored in the tray 24 are fed to the second image forming means 18b to have the image which is supported on the opposite side of the document printed on the opposite side of each printing sheet. The printing sheets can be fed from the tray 24 in the same manner as printing sheets are fed in the ordinary single-side copying and printing operation without requiring an operation performed by any component of the first image forming means 18a. Thus, the invention enables the single-side copying and printing operation and the both-sides copying and printing operation to be performed simultaneously without any trouble. If a single-side copying and printing operation were performed by the first image forming means 18a, it would be impossible to perform the single-side and both-sides copying and printing operations simultaneously. Thus, the copying apparatus would lack compatibility.

The copying apparatus according to the invention enables a single-side copying and printing operation to be performed, while a both-sides copying and printing operation is being performed on one document, on another document by utilizing the second image forming means 18b by squeezing the single-side copying and printing operation into the both-sides copying and printing operation. In this case, the document for the single-side copying and printing operation is fed manually through a reversing path 37 of the document reversing means 35, and the operation of copying the image supported on one side of the document for the both-sides copying and printing operation is continued by the first image forming means 18a and the printing sheets printed on one side thereof with the image of the document are temporarily stored in the printing sheets reversing intermediate tray 24. After the single-side copying and printing operation of the document fed through the reversing path 37 has been performed by the second image forming means 18b, the printing sheets in the printing sheets reversing intermediate tray 24 are fed to the photosensitive drum 1b to have the image of the document for the both-sides copying and printing operation printed on the opposite side of each printing sheet which has one side thereof already printed with the image of the document.

The same steps as described hereinabove may be taken when jamming of sheets occurs in the second image forming means 18b while the both-sides and single-side copying and printing operations are being performed. When jamming of sheets occurs in the second image forming means 18b, the second image forming means 18b is shut down but the copying operation is continued by the first image forming means 18a and the printing sheets each having on one side thereof the image of the document printed thereon are temporarily stored in the printing sheet reversing intermediate tray 24. After the jam in the second image forming means 18b has been eliminated, the printing sheets in the tray 24 are fed to the photosensitive drum 1b to have the image of the document printed on the opposite side of each printing sheet.

In an operation mode in which the two image forming means 18a and 18b are actuated in a coordinated fashion, copying can be performed not only for printing images on both sides of each printing sheet but also for printing an image on one side of each printing sheet particularly by utilizing the coordinated operation of the two image forming means 18a and 18b. For example, it is possible to produce two copies of a document having images on both sides thereof in which one copy has printed thereon the image which is supported on one side of the document and the other copy has printed thereon the image which is supported on the opposite side of the document. In this case, a document having images on both sides thereof is placed on the document support 14a and the image on one side of the document is copied by the photosensitive drum 1a and the devices associated therewith on a printing sheet 7a. The printing sheet 7a thus processed is discharged into the printing sheet reversing intermediate tray 24. Then, the document on the contact glass member 4a is conveyed to the contact glass member 4b and set thereon after having its posture reversed by the document reversing means 35. Thereafter, the image supported on the other side of the document is copied by the photosensitive drum 1b and the devices associated therewith on a printing sheet 7b. The operation described hereinabove may be repeatedly performed with respect to different documents, to obtain two copies for each document in which one copy has printed thereon the image of the document which is supported on one side thereof and the other copy has printed thereon the image of the document which is supported on the other side thereof.

In producing copies each having an image of a document printed on one side thereof, multiple copying may be performed for producing copies in which the contents of a plurality of documents are superposed one over another in a single copy. In this case, the image of a document is printed by the photosensitive drum 1a and the devices associated therewith on a printing sheet 7a, and the printing sheet 7a thus processed is fed to the photosensitive drum 1b side through the printing sheet reversing and conveying means 23 which remains inoperative, so that the printing sheet 7a is forwarded to the second image forming means 18b without having its posture reversed. Thus, the image of a document placed on the contact glass member 4b is printed on the side of the printing sheet 7a on which the image of the document has already been printed by the first image forming means 18a. Thus, the printing sheet 7a has printed on one side thereof two images of two documents in superposed or overlapping relation.

One might wish to produce a copy of B-4 size from two documents of B-5 size. In this case, one-half portion of a printing sheet 7a of B-4 size is printed with the image of one document by the first image forming means 18a, and this printing sheet 7a is forwarded to the photosensitive drum 1b side without having its posture reversed. Then, the image of the other document is printed on the other-half portion of the printing sheet 7a by the second image forming means 18b. This process also applies to the production of a single copy having printed on one side thereof the images of a document each supported by one of both sides thereof.

As described hereinabove, the printing sheet reversing intermediate tray 24 can be used as a sheet discharging tray for the first image forming means 18a in a single-side copying and printing mode. Thus a variety of types of copying can be performed in the single-side copying and printing mode.

In the embodiment shown and described hereinabove, the optical systems 5a and 5b are used for the photosensitive drums 1a and 1b respectively. However, this is not limiting, and one optical system may be used in place of the two optical systems 5a and 5b in the invention. Such optical system would perform scanning in cooperation with the photosensitive drum 1a when the image of a document is copied on one surface of printing sheets and move to the photosensitive drum 1b side and perform scanning there to copy the image of a document on the opposite side of the printing sheets. Alternatively, the single optical system may be located in the central portion and include two image forming systems one for each of the two photosensitive drums 1a and 1b.

Thus, when the two image forming means 18a and 18b are operated in a coordinated fashion, it is possible for the copying apparatus according to the invention to perform a variety of copying operations including a both-sides copying and printing operation, an operation for producing copies printed with an image on one side thereof from a document having images on both sides thereof, an operation of printing a multiple image on one side of each printing sheet, and an operation of printing a composite image on one side of each printing sheet. Thus, the copying apparatus according to the invention is high in versatility.

Figure 5:
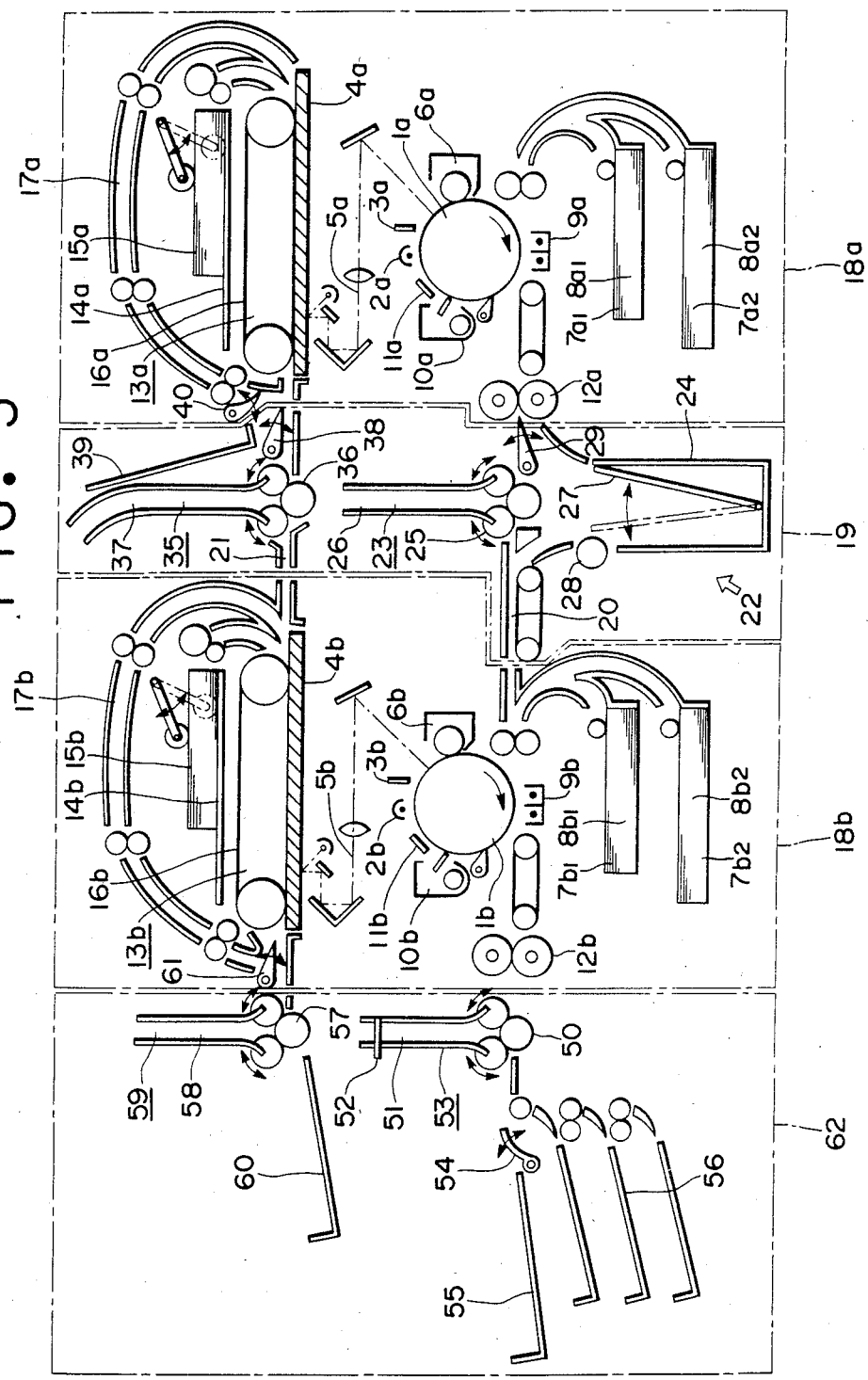
FIG. 5 is a schematic side view of the copying apparatus comprising another embodiment.

FIG. 5 shows another embodiment of the copying apparatus in comformity with the invention. The photosensitive drum 1a, charger 2a, eraser 3a, contact glass member 4a, optical system 5a, developing device 6a, sheet feeding section 8a₁ and 8a₂, separating and printing charger 9a, cleaning device 10a, charge removing device 11a, fixing device 12a, automatic document conveying means 13a, document support 14a, conveyer belt 16a and recycling path 17a constitute the first image forming means 18a. Likewise, the photosensitive drum 1b, charger 2b, eraser 3b, contact glass member 4b, optical system 5b, developing device 6b sheet feeding section 8b₁ and 8b₂, separating and printing charger 9b, cleaning device 10b, charge removing device 11b, fixing device 12b, automatic document conveying means 13b, document support 14b, conveyor belt 16b and recycling path 17b constitute the second image forming means 18b. The first and second image forming means 18a and 18b form two separate units.

The first and second image forming units 18a and 18b are connected together by a reversing and conveying unit 19 comprising the printing sheet transporting path 20 and document transporting path 21 formed into a unitary structure. The printing sheet transporting path 20 which connects the photosensitive drums 1a and 1b together for transporting the printing sheets 7a from the first image forming unit 18b to the second image froming unit 18b is substantially straight and has the printing sheet reversing means 22 disposed therein. The printing sheet reversing means 22 includes the printing sheet reversing and conveying means 23 for reversing the posture of each printing sheet and immediately transporting same to the second unit 18b, and the printing sheet reversing intermediate tray 24 disposed below the printing sheet reversing and conveying means 23 for temporarily storing a plurality of printing sheets 7a and reversing their posture and feeding same when the need arises. As is well known, the printing sheet reversing and conveying means 23 includes the set of three rollers 25, and reversing path 26. When the two follower rollers 25 disposed above the drive roller 25 open the reversing path 26 as shown in FIG. 5, the printing sheet 7a finds its way into the reversing path 26 where it has its posture reversed before being transported to the second unit 18b. However, when the reversing path 26 is closed by the follower rollers 25, the printing sheet 7a does not enter the reversing path 26 and transported directly to the second unit 18b. The printing sheet reversing intermediate tray 24 is provided with the pressure applying partition plate 27 and sheet feeding roller 28. The switch member 29 for selectively actuating the printing sheet reversing and conveying means 23 and printsheet reversing intermediate tray 24 is provided. The partition plate 27 can be rotated by a drive means for example a motor which is not shown.

Meanwhile, the document transporting path 21 which connects the automatic document conveying means 13a and 13b together for transporting the documents 15a from the first unit 18a to the second unit 18b is substantially straight and has the document reversing means 35 disposed therein. Like the printing sheet reversing and conveying means 23, the document reversing and conveying means 35 includes the set of three rollers 36 and reversing path 37 which concurrently serve as means for manually inserting a document. The switch member 38 is located posterior to the automatic document conveying means 13a to selectively actuate the document transporting path 21 and recycling path 17a. The switch member 40 for selectively actuating the discharge tray 39 for the automatic document conveying means 13a and the recycling path 17a is also provided.

Disposed posterior to the fixing device 12b on the photosensitive drum 1b side is the reversing and discharging means 53 including the set of three rollers 50, reversing path 51 and sheet folding stopper 52. Disposed posterior to the reversing and discharging means 53 are the ejecting tray 55 and sorter 56 which are selectively actuated by the switch member 54. The ejecting tray 60 is disposed posterior to the automatic document conveying means 13b through the reversing and discharging means 59 having the set of three rollers 57 and reversing path 58. The numeral 61 designated the switch member for selectively actuating the reversing and discharging means 59 and recycling path 17b. The reversing and discharging means 53 and 59, ejecting trays 55 and 60 and sorter 56 constitute a discharging unit which is detachably attached to the discharge end of the copying apparatus.

The embodiment of aforesaid construction is capable of performing operations in a variety of copying and printing modes for copying and printing the image of a document not only on one side but also on either side of a printing sheets. The copying apparatus can be set at various copying modes by switches and control circuits of known type which are not shown in the drawings.

When the operation of copying and printing the image of a document on both sides of printing sheets is performed, the first and second image forming units 18a and 18b are connected together by the reversing and conveying unit 19. In a both-sides printing mode, the first image forming unit 18a produces copies each having the image of a document which is supported on one side thereof printed on one side of each copy and the second image forming unit 18b prints on an opposite side of each of these copies the image of the document which is supported on an opposite side thereof, so that the desired copies can be produced by the coordinated action of the first and second image forming units 18a and 18b. In this case, the printing sheets 7a are transported from the photosensitive drum 1a side to the photosensitive drum 1b side via the printing sheet transporting path 20 which is substantially straight and short. This is conducive to a reduction in the incidence of jamming of the printing sheets and a rise in the speed at which copying is performed. The document transporting path 21 connecting the automatic document conveying means 13a and 13b together is also substantially straight and short, so that the incidence of jamming of the documents is also reduced. After the printing sheets 7a have had one side thereof printed with the image of the document 15a, each printing sheet 7a is transported from the first unit 18a to the second unit 18b via the printing sheet reversing and conveying means 23 in which it has its posture reversed. Stated differently, the printing sheet 7a is placed on the contact glass member 4b in the same manner as it is placed on the contact glass member 4a. Thus, the arrangement of the devices for performing the copying process in association with the photosensitive member 1b including the optical system 5b is no different from the arrangement of the devices for performing the copying process in association with the photosensitive member 1a including the optical system 5a. This makes it possible to simplify the construction of the copying apparatus, particularly, of the optical systems, because the need to bring the image into alignment with each other can be eliminated. As a result, the documents can be transported from the first unit 18a to the second unit 18b by simple means. Combined with the provision of the automatic document conveying means 13a and 13b, this feature enables a large number of copies having images printed on both sides thereof to be produced automatically in a short period of time.

By removing the reversing and conveying unit 19 to disconnect the two image forming units 18a and 18b, the copying apparatus can have two copying machines operable independently of each other. Thus, by using either the image forming unit 18a or the image forming unit 18b, it is possible to product copies having the image of a document printed on one side thereof. By placing the documents 15a and 15b on the automatic document conveying means 13a and 13b and feeding the printing sheets 7a and 7b from the feeding sections 8a and 8b, respectively, it is possible to actuate the two machines simultaneously to perform two single-side copying and printing operations with respect to different documents by means of the photosensitive drums 1a and 1b, optical systems 5a and 5b and other devices. It is, of course, possible to perform one single-side copying and printing operation by using one machine while rendering the other machine inoperative. Thus, when the number of copies to be produced is very large, the copying time can be reduced to one-half by using the two machines. In this case, the operator only has to attach a document ejecting tray and a printing sheet ejecting tray to each of the first and second image forming units 18a and 18b for discharging the documents 15a and 15b and printing sheets 7a and 7b thereinto. In this case, the path of travel of the printing sheets is shorter than when they have images of a document printed on both sides thereof, thereby reducing the copying time.

When the first and second image forming units 18a and 18b are connected together by the reversing and conveying unit 19, it is possible to perform not only the both-sides copying and printing operation but also special single-side copying operations by utilizing the connection between the two units 18a and 18b. For example, a document having images on both sides thereof may be processed to produce copies having the images of such document printed on one side thereof. In this case, the document 15a is placed on the document support 14a and the image supported on one side of the document is copied and printed on a printing sheet 7a, and the printing sheet 7a is discharged into the printing sheet reversing intermediate tray 24. Then, the document 15a is conveyed to the contact glass member 4b from the contact glass member 4a after having its posture reversed by the document reversing means 35. Thereafter, the image supported on an opposite side of the document 15a is copied and printed on a printing sheet 7a by means of the photosensitive drum 1b and other devices. The operation described hereinabove is repeatedly performed, so that the operation of producing copies having images on one side thereof from documents each having images supported on both sides thereof can performed automatically.

Also, multiple copying may be performed for producing copies in which the contents of a plurality of documents are superposed one over another in a single copy. In this case, the image of a document is copied and printed on one side of a printing sheet 7a by the first image forming unit 18a, and the printing sheet 7a thus processed is conveyed to the photosensitive drum 1b of the second image forming unit 18b through the printing sheet reversing and conveying means 23 which remains inoperative so that the printing sheet 7a does not have its posture reversed. In the second image forming unit 18b, the image of a document placed on the contact glass member 4b is copied and printed on the one side of the printing sheet 7a in superposed relation to the image of the document copied and printed thereon by the first image forming unit 18a.

A copy of B-4 size may be produced from two documents of B-5 size. In this case, the image of one document is copied and printed by the first image forming unit 18a on one-half portion of one side of a printing sheet 7a of B-4 size, and the printing sheet 7a thus processed is conveyed to the second image forming unit 18b, the image of the other document is copied and printed on the other-half portion of the one side of the printing sheet 7a. This process also applies to the production of a single copy having printed thereon the images of a document each supported by one of both sides thereof.

By connecting the first and second image forming units 18a and 18b together by the reversing and conveying unit 19, it is possible for the copying apparatus according to the invention to perform a variety of copying operations including a both-sides copying operation, an operation for producing copies printed with an image on one side thereof from a document having images on both sides thereof, an operation of copying and printing a multiple image on one side of each printing sheet, and an operation of printing a composite image on one side of each printing sheet. Thus, the copying appratus according to the invention is high in versatility.

What is claimed is:

1. A copying apparatus capable of copying and printing an image of a document on a printing sheet on one or both sides thereof, comprising:
   a pair of image recording units, each said unit comprising a document exposure station, a document conveying means for conveying a document to said exposure station, an image recording member, an optical system for exposing said image recording member to an optical image of a document at said exposure station, a developing device for developing an exposed image on said image recording member, and a printing sheet conveying path for conveying a printing sheet to transfer a developed image from said image recording member to the printing sheet;
   a printing sheet transporting path connecting the printing sheet conveying paths of the pair of image recording units together;
   a printing sheet reversing intermediate tray arranged in the ptinting sheet transporting path and provided with a switch member for selectively guiding printing sheets from said transporting path to said intermediate tray;
   a partition plate pivotably supported in the printing sheet reversing intermediate tray;
   a drive unit for driving said partition plate for pivotal movement from a printing sheet receiving position to a sheet feeding position; and
   a sheet feeding roller associated with said intermediate tray for feeding printing sheets from the feeding position.

2. A copying apparatus as claimed in claim 1, wherein said intermediate tray are provided with at least two partition plates whereby said intermediate tray can receive printing sheets from a first of said image recording units simultaneously with feeding printing sheets to the second image recording unit.

3. A copying apparatus as claimed in claim 1, wherein each of said image recording units is formed as a unitary recording structure, said printing sheet transporting path including said intermediate tray is formed as a unitary passage structure, and the pair of recording structures are connected together by said passage structure.

4. A copying apparatus as claimed in claim 1, wherein said printing sheet transporting path includes a printing sheet reversing and conveying means arranged parallel to said printing sheet reversing intermediate tray, said switch member and said reversing and conveying means being selectively operable to effect separate sheet copying of both sides of a document, and said switch member and said intermediate tray being selectively operable to effect repeat copying or batch copying of both sides of a document.

5. A copying apparatus as claimed in claim 1, wherein said printing sheet transporting path further includes a straight passage and a second intermediate tray located parallel to said straight passage, and a second switch member selectively operable to guide printing sheets into said straight passage or said second intermediate tray, said second intermediate tray being arranged to temporarily store a plurality of printing sheets and provided with a second sheet feeding roller for feeding printing sheets therefrom.

6. A copying apparatus capable of copying and printing an image of a document on a printing sheet on one or both sides thereof, comprising:
   a pair of image recording units, each said unit comprising a document exposure station, a document conveying means for conveying a document to said exposure station, an image recording member, an optical system for exposing said image recording member to an optical image of a document at said exposure station, a developing device for developing an exposed image on said image recording member, and a printing sheet conveying path for conveying a printing sheet to transfer a developed image from said image recording member to the printing sheet;
   a printing sheet transporting path connecting the printing sheet conveying paths of the pair of image recording units together;
   a printing sheet reversing and conveying means and a printing sheet reversing intermediate tray arranged parallel to each other in the printing sheet transporting path and provided with a switch member for selectively guiding printing sheets from said transporting path to said reversing and conveying means or said intermediate tray;
   a partition plate pivotably supported in the printing sheet reversing intermediate tray;
   a drive unit for driving said partition plate for pivotal movement between a printing sheet receiving position and a feeding position;
   a sheet feeding roller associated with said intermediate tray for feeding printing sheets from the feeding position;
   a document transporting path connecting the document conveying means of said pair of image recording units together; and
   a document reversing means arranged in said document transporting path and provided with a document switch member selectively operable for forwarding a document directly from the document conveying means of a first one of said image recording units to the document conveying means of the second image recording unit, or through said document reversing means.

7. A copying apparatus as claimed in claim 6, wherein an ejecting tray is provided for receiving documents from at least the document conveying means of the second image recording unit.

8. A copying apparatus as claimed in claim 6, wherein each of said image recording units is formed as a unitary recording structure, said printing sheet transporting path including said intermediate tray and said document transporting path including said document reversing means are formed as a unitary passage structure, and said pair of recording structures are connected together by said passage structure.

9. A copying apparatus as claimed in claim 6 selectively operable in the following modes:
   (a) said direct forwarding of documents on said document transporting path and said printing sheet reversing and conveying means being operable to effect separate sheet copying of one side of a document on both sides of a printing sheet;
   (b) said document reversing means on said document transporting path and said printing sheet reversing and conveying means being operable to effect separate sheet copying of both sides of a document on both sides of a printing sheet;
   (c) said direct forwarding of documents on said document transporting path and said printing sheet reversing intermediate tray being operable to effect repeat or batch sheet copying of one side of a document on both sides of a printing sheet;

(d) said document reversing means on said document transporting path and said printing sheet reversing intermediate tray being operable to effect repeat or batch sheet copying of both sides of a document on both sides of a printing sheet;

(e) said printing sheet reversing intermediate tray being operable to receive one-side copied printing sheets in the event of a jam in said printing sheet reversing and conveying means or in the second recording unit;

(f) said switch member on said printing sheet transporting path being operable for forwarding printing sheets directly from the first image recording unit to the second image recording unit for superimposed copying on one side of a printing sheet; and (g) said document transporting path and said printing sheet transporting path being rendered inoperable to provide two separate copying units from said pair of image recording units.

10. A copying apparatus as claimed in claim 6, wherein said printing sheet transporting path further includes a straight passage and a second intermediate tray located parallel to said straight passage, and a second switch member selectively operable to guide printing sheets into said straight passage or said second intermediate tray, said second intermediate tray being arranged to temporarily store a plurality of printing sheets and provided with a second sheet feeding roller for feeding printing sheets therefrom.

11. A copying apparatus as claimed in claim 10, wherein said printing sheet reversing and conveying means and said second intermediate tray are operable in the event of a jam in said printing sheet reversing intermediate tray or in the second image recording unit.

* * * * *